US007016765B2

(12) United States Patent
Bellchambers

(10) Patent No.: US 7,016,765 B2
(45) Date of Patent: Mar. 21, 2006

(54) METHOD OF HANDLING A LOAD

(75) Inventor: Andrew Bellchambers, Staffordshire (GB)

(73) Assignee: J.C. Bamford Excavators Limited, Staffordshire (GB)

( * ) Notice: Subject to any disclaimer, the term of this patent is extended or adjusted under 35 U.S.C. 154(b) by 0 days.

(21) Appl. No.: 10/706,201

(22) Filed: Nov. 12, 2003

(65) Prior Publication Data

US 2004/0151568 A1 Aug. 5, 2004

(30) Foreign Application Priority Data

Nov. 13, 2002 (GB) .................................... 0226417

(51) Int. Cl.
*G06F 7/00* (2006.01)

(52) U.S. Cl. ....................... 700/214; 700/259; 414/809

(58) Field of Classification Search ................ 700/214, 700/213, 258, 259; 414/809; 901/47; 356/399, 356/400, 138

See application file for complete search history.

(56) References Cited

U.S. PATENT DOCUMENTS

| | | | | |
|---|---|---|---|---|
| 3,854,820 | A | 12/1974 | Hansen | |
| RE29,025 | E * | 11/1976 | Hansen | 356/138 |
| 4,678,329 | A | 7/1987 | Lukowski, Jr. et al. | |
| 4,918,607 | A | 4/1990 | Wible | |
| 4,947,094 | A | 8/1990 | Dyer et al. | |
| 4,996,468 | A | 2/1991 | Field et al. | |
| 5,208,753 | A * | 5/1993 | Acuff | 701/50 |
| 5,586,620 | A * | 12/1996 | Dammeyer et al. | 187/227 |
| 5,812,395 | A * | 9/1998 | Masciangelo et al. | 700/56 |
| 6,150,938 | A * | 11/2000 | Sower et al. | 340/557 |
| 6,194,860 | B1 * | 2/2001 | Seelinger et al. | 318/587 |
| 6,301,371 | B1 * | 10/2001 | Jones et al. | 382/106 |
| 6,411,210 | B1 * | 6/2002 | Sower et al. | 340/557 |
| 6,795,187 | B1 * | 9/2004 | Kokura | 356/399 |

FOREIGN PATENT DOCUMENTS

DE 38012133 A1 7/1989

(Continued)

*Primary Examiner*—Khoi H. Tran
(74) *Attorney, Agent, or Firm*—Marshall, Gerstein & Borun LLP

(57) ABSTRACT

A method of handling a load at a high desired load handling position using a mobile loading machine of the kind having a loading arm connected at one end to a body of the machine for movement at least about a generally horizontal axis between a lower travelling position, and a higher load handling position, and the arm having at its outermost end a loading implement for carrying the load, the method including the steps of manoeuvring the machine with the arm in the lower travelling position generally below the load handling position, and then one of:

a) directing a signal from the machine upwardly towards the load handling position in a plane in which a reference point of the loading implement is movable as the arm is raised about the generally horizontal axis, or b) directing a signal downwardly from at or adjacent the load handling position in a plane in which a reference point of the loading implement would be moveable if the arm is raised about the generally horizontal axis with the machine in a correct lateral position, to ascertain whether the machine is correctly laterally positioned, so that if the arm is lifted, the loading implement is positionable at the load handling position, manoeuvring the machine as necessary until the machine is correctly laterally positioned and then raising the loading arm to raise the loading implement towards the load delivery position.

6 Claims, 2 Drawing Sheets

FOREIGN PATENT DOCUMENTS

| | | | |
|---|---|---|---|
| DE | 10101705 | A1 | 7/2001 |
| EP | 0808755 | A1 | 11/1997 |
| EP | 0959038 | A2 | 11/1999 |
| GB | 1397753 | A1 | 6/1975 |
| GB | 1540705 | A1 | 2/1979 |
| GB | 2019809 | A1 | 11/1979 |
| GB | 2341380 | A1 | 3/2000 |
| GB | 2346362 | A1 | 8/2000 |
| JP | 2002-321898 | A1 | 11/2002 |
| WO | WO 82/01412 | A1 | 4/1982 |

* cited by examiner

METHOD OF HANDLING A LOAD

BACKGROUND TO THE INVENTION

This invention relates to a method of handling a load with a mobile loading machine such as a wheeled loading machine.

Wheeled loading machines which have a loading arm which may be raised and lowered and extended and retracted to deliver or collect a load are known. However for the load to be accurately positioned for delivery, e.g. at height, or for a load to be collected from a height, it is a requirement that the machine is manoeuvred such that when the arm is raised a loading implement for handling the load, is laterally aligned with the desired position for unloading or loading.

It will be appreciated that for safety reasons, to maintain the stability of the loading machine when manoeuvred, the arm when carrying a load is in a lowered condition. Thus in the event that a load is to be delivered to a high position and the machine operator does not accurately laterally align the machine, when the arm is raised the load will not be deliverable to the desired load delivery position Thus to comply with safety requirements, the operator must lower the loaded arm again before manoeuvring the machine in an effort more accurately to laterally to align the machine. This is time consuming and can lead to the operator manoeuvring the machine with the load lifted to a high position, which is contrary to safety requirements.

It will be appreciated that for a wheeled loading machine, particularly one with a telescopic loading arm which is capable of lifing loads to very high height, say up to 15 metres or higher, a misalignment of the machine by even a small amount, e.g. a few centimetres when the arm is lowered, can result in a substantial misalignment of the load, from a desired load handling position, when the loading arm is raised.

DESCRIPTION OF THE PRIOR ART

Proposals have been put forward to allow the loading implement to be shiftable sideways, so that in the event of a minor lateral misalignment when the load is raised, the load can be shifted sideways towards the load delivery position with the arm in a raised condition. However shifting a heavy load sideways can lead to lateral instability of the machine, and in any event to provide for such lateral side shifting of the load, the arm/loading implement needs to be provided with additional actuators.

According to one aspect of the invention we provide a method of handling a load at a high desired load handling position using a mobile loading machine of the kind having a loading arm connected at one end to a body of the machine for movement at least about a generally horizontal axis between a lower travelling position, and a higher load handling position, and the arm having at its outermost end a loading implement for carrying the load, the method including the steps of manoeuvring the machine with the arm in the lower travelling position generally below the load handling position, and then one of:

a) directing a signal from the machine upwardly towards the load handling position in a plane in which a reference point of the loading implement is movable as the arm is raised about the generally horizontal axis, or b) directing a signal downwardly from at or adjacent the load handling position in a plane in which a reference point of the loading implement would be moveable if the arm is raised about the generally horizontal axis with the machine in a correct lateral position, to ascertain whether the machine is correctly laterally positioned, so that if the arm is lifted, the loading implement is positionable at the load handling position, manoeuvring the machine as necessary until the machine is correctly laterally positioned and then raising the loading arm to raise the loading implement towards the load handling position.

Thus utilising the method of the invention, there is no need for an operator to raise the arm to see if the machine is correctly laterally aligned with the load handling position for the load to be delivered or collected.

Where the signal is directed from the machine towards the load handling implement the signal may be a simple light beam, a fan of light in the plane of movement of the reference point of the loading arm so that it is unnecessary to adjust a beam up and down in the plane to direct the light at the load handling position. Thus, correct lateral positioning can be checked by the operator viewing where the directed light falls.

The light is preferably a high intensity light such as collimated laser light so that the light can be seen by the machine operator even on a bright day.

The reference point of the loading implement may be a laterally central position of the loading implement, which may lie generally along an elongate axis of the loading arm or the reference point may lie to one or other side of the axis as required.

The signal may be directed towards the load handling position from an signalling device carried on the loading arm or on the body of the machine as necessary to direct the light in the plane.

Where the signal is directed in a plane from at or adjacent the load handling position towards the machine, the signal may be light receivable by a receiver such as a sight of the machine, at least when the machine is correctly laterally positioned, or a non-visible signal such as a sonic or non-visible electromagnetic signal, receivable by an appropriate receiver on the machine.

The method may include not only raising the loading arm to deliver or collect a load from the load handling position, but where the arm includes a plurality of relatively telescopic sections, extending the arm to move the loading implement axially of the arm towards the load handling position for unloading or loading.

The loading implement may typically be a loading fork but other kinds of loading implements may be utilised in the performance of the invention.

According to a second aspect of the invention we provide a method of handling a load at a high desired load handling position using a mobile loading machine of the kind having a loading arm connected at one end to a body of the machine for movement at least about a generally horizontal axis between a lower travelling position, and a higher load handling position, and the arm having at its outermost end a loading implement for carrying the load, the method including the steps of directing a signal from at or adjacent the load handling position downwardly towards the machine, and manoeuvring the machine with the arm in the lower travelling position generally below the load handling position, until the signal is received by a receiver of the machine to indicate that the machine is in a correct lateral position so that if the arm is raised, the loading implement is positionable at the load handling position, and then raising the loading arm to raise the loading implement towards the load handling position.

This aspect of the invention may require an illuminating or other signalling device to be located at or adjacent to the load handling position or a target to be positioned at or adjacent the load handling position, from which the signal may pass to the receiver. In each case depending upon the geometry of the machine, the receiver may be located adjacent the machine operator so that the machine operator may use the receiver directly visually. Alternatively, the receiver may be provided by a camera which provides a signal to a screen viewer which may be viewed by the machine operator.

In each case the operator may obtain knowledge of where the loading implement may be positioned upon raising, prior to the loading arm being raised.

According to a third aspect of the invention we provide a mobile loading machine of the kind having a loading arm connected at one end to a body of the machine for movement at least about a generally horizontal axis between a lower travelling position, and a higher load handling position, and the arm having at its outermost end a loading implement for carrying the load, the machine being manoeuvrable with the arm in the lower travelling position to below a high load handling position, the machine further including an device for directing a signal upwardly towards the load handling position in a plane in which a reference point of the loading implement is movable as the arm is raised about the generally horizontal axis.

The signalling device may produce a fan or beam of light.

According to a fourth aspect of the invention we provide a mobile loading machine of the kind having a loading aim connected at one end to a body of the machine for movement at least about a generally horizontal axis between a lower travelling position, and a higher load handling position, and the arm having at its outermost end a loading implement for carrying the load, the machine including a receiver, the machine being manoeuvrable with the arm in the lower travelling position to generally below the load handling position, as necessary until a signal from at or adjacent the load handling position is received by the receiver to indicate that the machine is in a correct lateral position.

The signal may be light and the receiver may be a viewer which is located adjacent the machine operator so that the machine operator may use the viewer directly visually. Alternatively, the receiver may be provided by a camera which provides a signal to a screen viewer which may be viewed by the machine operator.

BRIEF DESCRIPTION OF THE DRAWINGS

Embodiments of the invention will now be described with reference to the accompanying drawings in which.

DESCRIPTION OF THE PREFERRED EMBODIMENTS

Figures 1, 2:
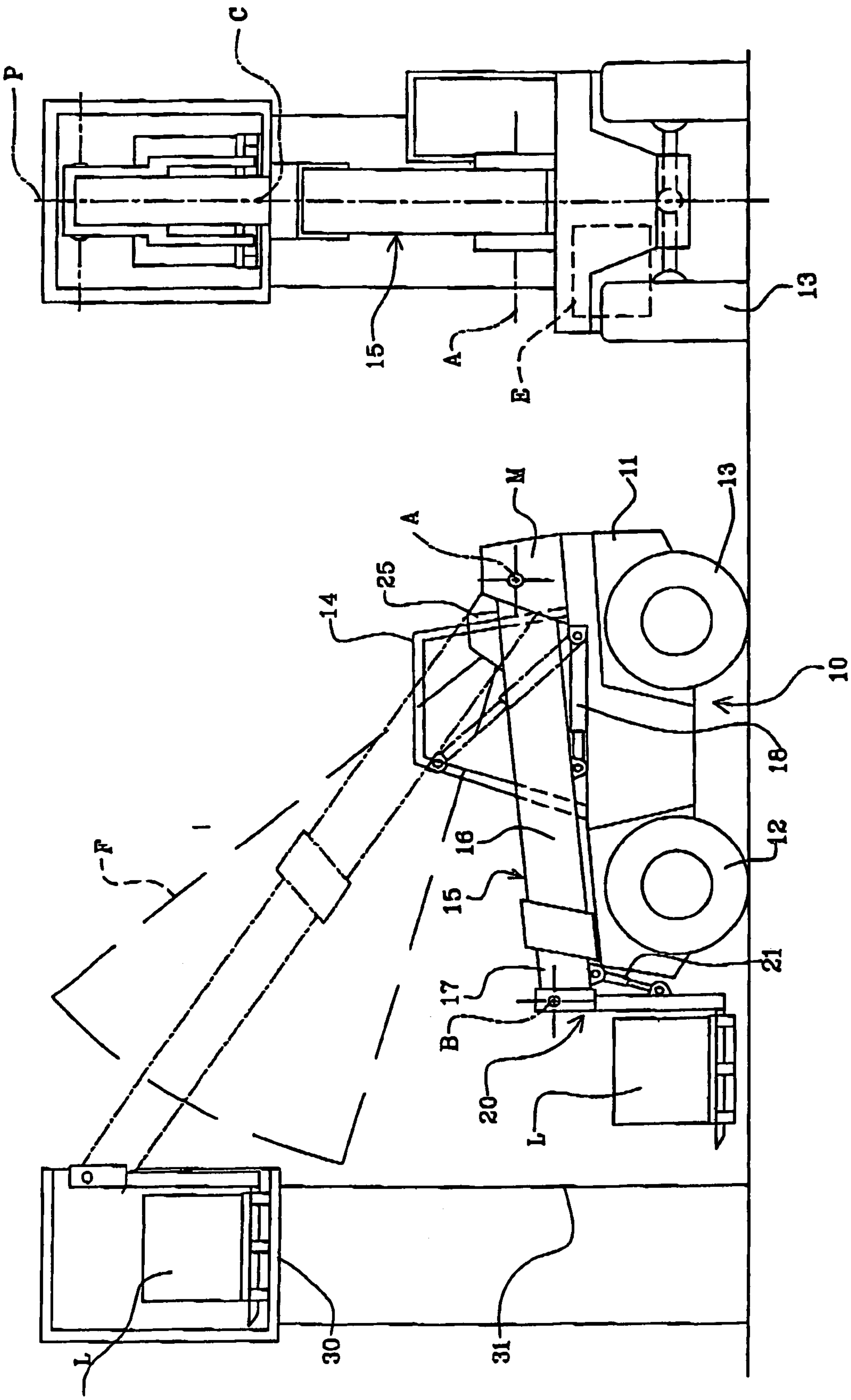
FIG. 1 is a side view of a mobile loading machine for use in a first embodiment of the invention, adjacent a load handling position.
FIG. 2 is a rear view of the machine of FIG. 1.

Referring to FIG. 1, a loading machine 10 is shown which includes a body 11 carried on a ground engaging structure which in this example includes front 12 and rear 13 ground engaging wheels by means of which the machine 10 may be driven over the ground by a machine operator in an operator's cab 14 at one side of the body 11.

At least one of the front 12 and rear 13 wheels are steerable, and the machine 10 may be powered by an engine E or motor which may be side mounted as shown on an opposite side of the body 11 to the cab 14, and driven over the ground by a mechanical and/or hydrostatic transmission, as desired.

The machine has a loading arm 15 which in this case includes a pair of telescoped sections 16, 17, but in another embodiment may have more than two sections 16, 17. A first of the arm sections, section 16, is connected to the body 11 of the machine 10 so that the arm 15 is mounted for up and down movement about a generally horizontal axis A by one or more actuators 18, between the engine E and the cab 14, and a second aim section 17 carries a loading implement 20 which in this case is a loading fork, but other loading implements may be utilised.

The fork 20 is mounted for pivotal movement relative to the arm 15 about a second generally horizontal axis B by one or more actuators 21.

Thus far the machine 10 is generally conventional.

However, in accordance with a first aspect of the invention, the machine 10 is provided with an illuminating device 25 which in this case is mounted on a top of the loading arm 15, and when required, produces a fan F of intense preferably collimated, preferably laser light.

A reference point is provided, in this example, at a central position C of the loading fork 20. As the loading arm 15 is raised and lowered by the actuators 18 about the axis A, the reference point C moves in a generally vertical plane, at least where the machine 10 is in a level attitude. The illuminating device 25 is located such that the fan F lies in the plane P.

In the case of a machine operator wishing to discharge a load L carried by the fork 20 at a high load handling position such as a platform 30 of a scaffolding tower 31, as seen in the drawings, the operator drives the machine with the loading arm 15 in a lowered travelling position shown in full lines in FIG. 1, and manoeuvres the machine 10 to bring the machine 10 to a position adjacent but below the high load handling position 30.

Before raising the loading arm 15 to raise the loading fork 20 and hence the load L towards the platform 30, the lateral alignment of the machine 10 with respect to the platform 30 can be checked by operating the illuminating device 25 to direct the fan of light generally upwards. If the platform 30 is struck by the fan F of light, the operator will know that by raising the arm 15, the reference point of the loading fork 20 will move in the plane of the fan F, and thus the load L may be discharged at the platform 30. Of course some extension of the arm 15 may be required too, in order to position the load L on the platform.

If desired, instead of a fan F of light, the illuminating device 25 may produce an upwardly directed beam, but in this case it may be necessary to provide for up and down adjustment of the beam in the plane P so that the beam may be directed to the platform 30 or other load handling position, whatever the height of the position.

If it is desired to collect a load from the platform 30 for example, the empty loading fork 20 may be raised to the platform after checking the lateral alignment of the machine 10 by directing light upwardly to the platform 30.

If desired, instead of mounting the illuminating device 25 on the loading arm 15, the device 25 may be mounted on a mount M of the arm 15, or on the side of the arm 15 or even on the body 11 of the machine e.g. on the cab 14, wherever it is necessary to mount the device according to the machine 10 geometry, so that the device 25 can direct light in the plane P or another reference plane from which the operator can determine the lateral alignment of the machine 10 relative to the load handling position e.g. platform 30.

In order for the directed light to be seen by the operator, the light produced by the illuminating device 25 must be sufficiently intense and/or coloured or otherwise arranged to be easily visible by the operator.

Preferably the light is in the normal visual spectrum readily visible by the operator without assistance, but the light may be in a spectrum requiring special glasses of the like to see it, for example ultraviolet or infrared light.

Figures 3, 4:
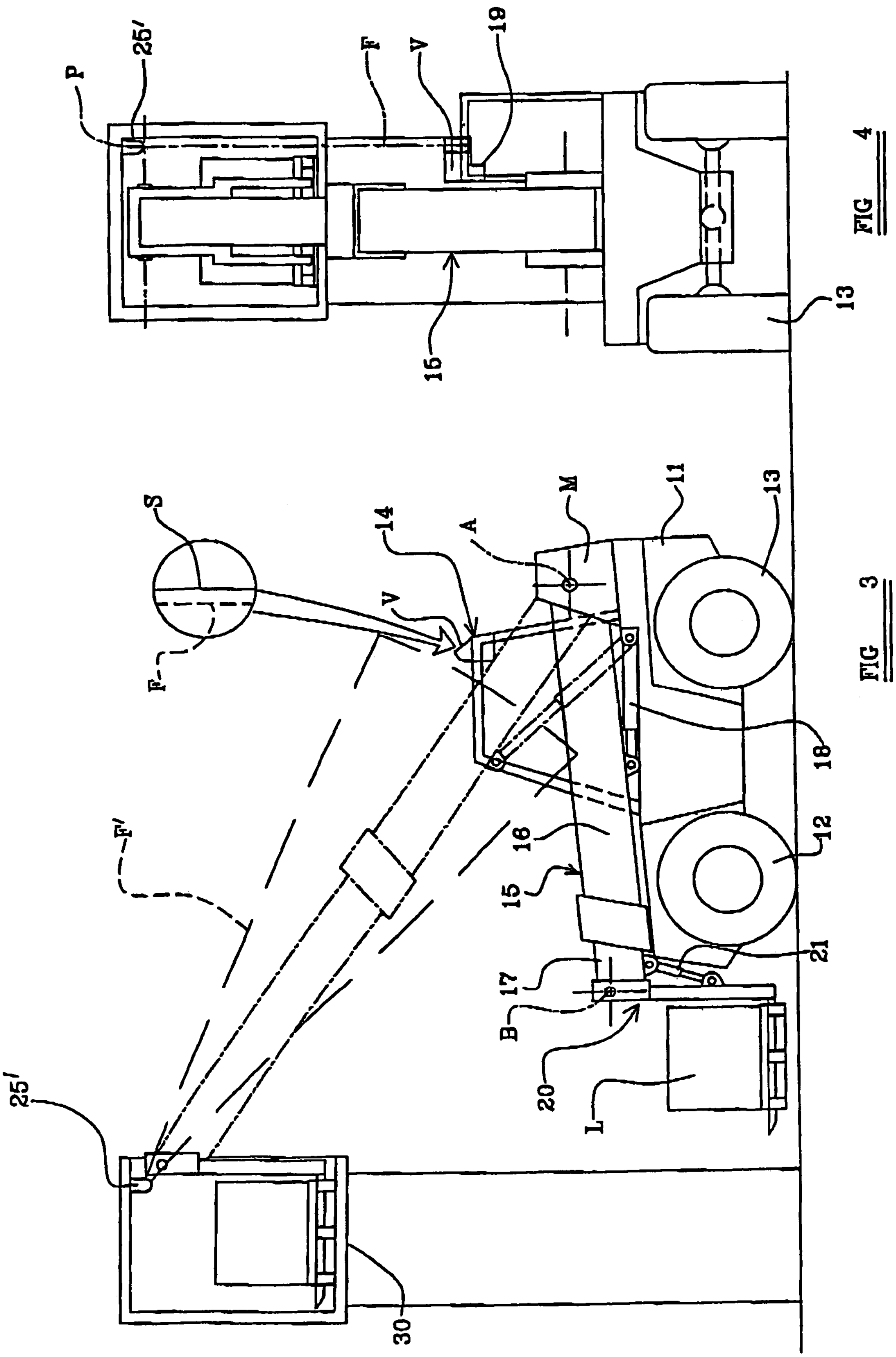
FIG. 3 is a side view of a mobile loading machine for use in a second embodiment of the invention, adjacent a load handling position.
FIG. 4 is a rear view of the machine of FIG. 3.

Referring to FIGS. 3 and 4 an alternative embodiment is shown. In this example a loading machine substantially similar to that shown in FIGS. 1 and 2 is shown with similar parts labelled by the same reference numerals.

In this embodiment, no illuminating device is provided on the machine 10. Rather an illuminating device 25' is provided on the platform 30 where the load L is to be handled. The illuminating device 25' downwardly directs a fan F' or a beam, in a plane P' With which the machine 10 must be laterally aligned, for the loading fork 20 to be raised to the platform 30 for handling the load L.

The light is received by a viewer V which is usable by the operator in the cab 14 directly visually. The viewer V includes a sight S (see inset to drawing). In use, the operator manoeuvres the machine 10 below the platform 30 until the light directed from the illuminating device 25' on the platform 30 coincides with the sight S, at which position, the operator knows the machine 10 is laterally aligned with the platform 30.

The viewer V in this example is located on the top of the cab 14 of the machine 10, to receive the directed light, and the illuminating device 25' is positioned to one side of the platform so that the sight S may be aligned with the plane P' in which the light is directed. In another embodiment, the viewer may be mounted on the loading arm 15 or elsewhere of the machine 10 to be alignable with the plane P' when the machine 10 is correctly aligned with the platform 30.

The viewer V includes internally a reflector, so that the operator can view the sight S from a screen 19 within the cab 14. In another example though, the sight S may be provided by a camera in the position of the viewer V, which camera receives the light from the illuminating device 25' and provides a signal to a viewing screen 19 in the operator's cab 14, so that the operator can view when the machine 10 is correctly laterally aligned with the platform 30.

It will be appreciated that provided there is a reference point on the platform 30, it may not be essential to provide an illuminating device 25' thereon, as the sight S may be able to receive ambient light reflected from any suitable reference point which it is known is positioned so that when the arm 15 is raised, the loading fork 20 will be raised to the platform 30 for load handling. In that case, the viewer V or camera may need to be focusable to enable the sight to be focused on the reference point.

Where there is no clear reference point on the platform 30, if desired a target may be provided at the platform 30 which may be viewed via the viewer V or camera and the machine 10 manoeuvred until the machine is laterally aligned with respect to the target.

In the examples described, light is used as a signal between the machine 10 and reference point of platform 30. In another example, a non-visible signal may be used with an appropriate viewer V or camera, or other receiver on the machine 10.

For example a sonic or non-visible electromagnetic signal may be used by providing a suitable transmitting device on the machine 10 and/or at or adjacent the load handling position, and a receiver at/or adjacent to the load handling position and/or machine 10 respectively.

For example the machine 10 may have one or more directional microphones to receive a sonic signal from a transponder provided at/or adjacent to the load handling position, or the machine 10 may have a radar type transmitting device and receiver, and electronic signal processing means to detect the direction of a target at or adjacent the load handling position.

Although in the examples described, the loading machine 10 has been a wheeled loading machine 10, the invention may be used with any kind of mobile loading machine.

Although the embodiments of the invention as described include reference to the machine operator, the invention lends itself for use where the loading machine is a robotically operated machine, with a remote human operator and/or a computer controlled operator.

What is claimed is:

1. A method of handling a load at a high desired load handling position comprising the steps of:

a) using a mobile loading machine of the kind having a loading arm connected at one end to a body of the machine, the arm arranged for raising and lowering movement at least about a generally horizontal axis between a lower traveling position, and a higher load handling position, and the arm having an outermost end having a loading implement for carrying the load;

b) manoeuvring the machine with the arm in the lower traveling position generally below the load handling position, and then one of:

c) directing a signal from a vertically fixed position on the body upwardly towards the load handling position in a plane in which a reference point of the loading implement is movable as the arm is raised about the generally horizontal axis to ascertain whether the machine is correctly laterally positioned so that if the arm is lifted, the loading implement is positionable at the load handling position, manoeuvring the machine as necessary until the machine is correctly laterally positioned and then raising the loading arm to raise the loading implement towards the load handling position.

2. A method according to claim 1 wherein the signal is directed from the machine upwardly towards the load handling position, and the signal is light which is directed as a fan of light in the plane of movement of the reference point.

3. A method according to claim 1 wherein the light is high intensity light such as collimated laser light.

4. A method according to claim 1 wherein the reference point of the loading implement is a laterally central position of the loading implement, which lies generally along an elongate axis of the loading arm.

5. A method according to claim 2 wherein the light is directed upwardly towards the load handling position from an illuminating device carried on one of the loading arm and the body of the machine to direct the light in the plane.

6. A method according to claim 1 or 4 wherein the arm includes a plurality of relatively telescopic sections, the method including extending the arm to move the loading implement axially of the arm towards the load handling position.

* * * * *

UNITED STATES PATENT AND TRADEMARK OFFICE

CERTIFICATE OF CORRECTION

PATENT NO. : 7,016,765 B2
APPLICATION NO. : 10/706201
DATED : March 21, 2006
INVENTOR(S) : Andrew Bellchambers It is certified that error appears in the above-identified patent and that said Letters Patent is hereby corrected as shown below:

On the Title Page:

At Field (30), please delete “0226417” and insert -- 0226417.4 --.

In the Claims:

In claim 6, at Column 6, line 60, please delete “claim” and insert -- claims --.

Signed and Sealed this

Seventh Day of August, 2007

JON W. DUDAS
*Director of the United States Patent and Trademark Office*